United States Patent
Goldacker et al.

(10) Patent No.: US 8,361,175 B2
(45) Date of Patent: Jan. 29, 2013

(54) METHOD AND DEVICE FOR CONVERTING BIOMASS INTO GASEOUS PRODUCTS

(75) Inventors: Hubert Goldacker, Eggenstein-Leopoldshafen (DE); Andrea Kruse, Bruchsal (DE); Nicolaus Dahmen, Bruchsal (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 766 days.

(21) Appl. No.: 12/522,833

(22) PCT Filed: Dec. 20, 2007

(86) PCT No.: PCT/EP2007/011231
§ 371 (c)(1),
(2), (4) Date: Jul. 10, 2009

(87) PCT Pub. No.: WO2008/083823
PCT Pub. Date: Jul. 17, 2008

(65) Prior Publication Data
US 2010/0037520 A1    Feb. 18, 2010

(30) Foreign Application Priority Data
Jan. 13, 2007  (DE) .................. 10 2007 002 056

(51) Int. Cl.
- B09B 1/00 (2006.01)
- C01B 3/36 (2006.01)
- C01B 6/24 (2006.01)
- C01B 3/02 (2006.01)
- C01B 3/24 (2006.01)
- B01J 7/00 (2006.01)

(52) U.S. Cl. ......... 48/197 A; 48/197 R; 48/61; 423/644; 423/648.1; 423/650

(58) Field of Classification Search .......... 48/61, 197 R, 48/210, 197 A; 423/644, 648.1
See application file for complete search history.

(56) References Cited

U.S. PATENT DOCUMENTS

| | | | |
|---|---|---|---|
| 4,017,271 A | * | 4/1977 | Barclay et al. ............. 48/197 R |
| 4,822,497 A | | 4/1989 | Hong et al. |

(Continued)

FOREIGN PATENT DOCUMENTS

| | | |
|---|---|---|
| DE | 20220307 | 4/2003 |
| EP | 1686192 | 8/2006 |

(Continued)

OTHER PUBLICATIONS

Yusuf Raja "Gasification of Waste to Produce Low-BTU Gas by Molten Salt Technique", Journal of the Institution of Engineers, India, Electricalengineering Division, Institution of Engineers, Calcutta, IN, vol. 70, No. T2, Jan. 1, 1989, pp. 15-18, XP009099548.

(Continued)

*Primary Examiner* — Matthew Merkling
(74) *Attorney, Agent, or Firm* — Leydig, Voit & Mayer, Ltd.

(57) ABSTRACT

A method for converting biomass having a water content of at least 50% into gaseous products includes providing a reactor containing supercritical water and a salt melt. The salt melt includes at least one of a salt and a salt mixture. The reactor and the salt melt are heated to the reaction temperature. The biomass is heated to a preheat temperature. The biomass heated to the preheat temperature is fed into the salt melt. The biomass is heated to the reaction temperature so as to commence a conversion of the biomass into the gaseous products, so as to release from the biomass at least one additional salt into the salt melt. An amount of the salt melt containing at least a portion of the at least one additional salt is withdrawn from the reactor and the amount of the withdrawn salt melt is replaced with a fresh salt solution. The gaseous products are removed from the reactor.

10 Claims, 1 Drawing Sheet

U.S. PATENT DOCUMENTS

| | | | |
|---|---|---|---|
| 6,878,479 | B2 | 4/2005 | Cooper et al. |
| 2005/0066573 | A1 | 3/2005 | Cooper |

FOREIGN PATENT DOCUMENTS

| | | |
|---|---|---|
| JP | 2000084576 | 3/2000 |
| WO | WO-9964112 | 12/1999 |

OTHER PUBLICATIONS

N. Boukis et al. "Biomass gasification in supercritical water: First results of the pilot plant," in: A.V. Bridgewater, D.G.B. Boocock, Science in Thermal and Chemical Biomass Conversion, cplpress, vol. 2, p. 975, 2006.

G. Lee et al. "Comparison of the Effects of the addition of NaOH on the decomposition of 2chlorophenol and phenol in supercritical water and under supercritical water oxidation conditions", J. Supercritical Fluids, vol. 24, pp. 239-250, 2002.

D.D. MacDonald et al. "Probing the chemical and Electrochemical properties of the SCWO system", Electrochimica Acta, vol. 47, pp. 775-790, 2001.

K. Pripopsky et al. "SCWO of salt containing artificial wastewater using a transpiring wall reactor: Experimental" results, J. Supercritical Fluids, vol. 40, pp. 246-257, 2007.

M. Hodes et al.,"Salt precipitation and scale control in supercritical water oxidation—Part A: Fundamentals and research", J. Supercritical Fluids, vol. 29, pp. 265-288, 2004.

Z. Sun et al. Effects of potassium alkalis and sodium alkalis on the dechlorination of o-chlorophenol in supercritical water, Chemosphere, vol. 66, pp. 151-157, 2007.

M.D. Bermejo et al. "The influence of Na2S04 on the C02 solubility in water at high pressure", Fluid Phase Equilibria, vol. 238, pp. 220-228, 2005.

M.D. Bermejo et al. Bubble points of the systems isopropanol-water, isopropanol water-sodium acetate and isopropanol-water-sodium oleate at high pressure, Fluid Phase Equilibria, vol. 244, pp. 78-85, 2006.

\* cited by examiner

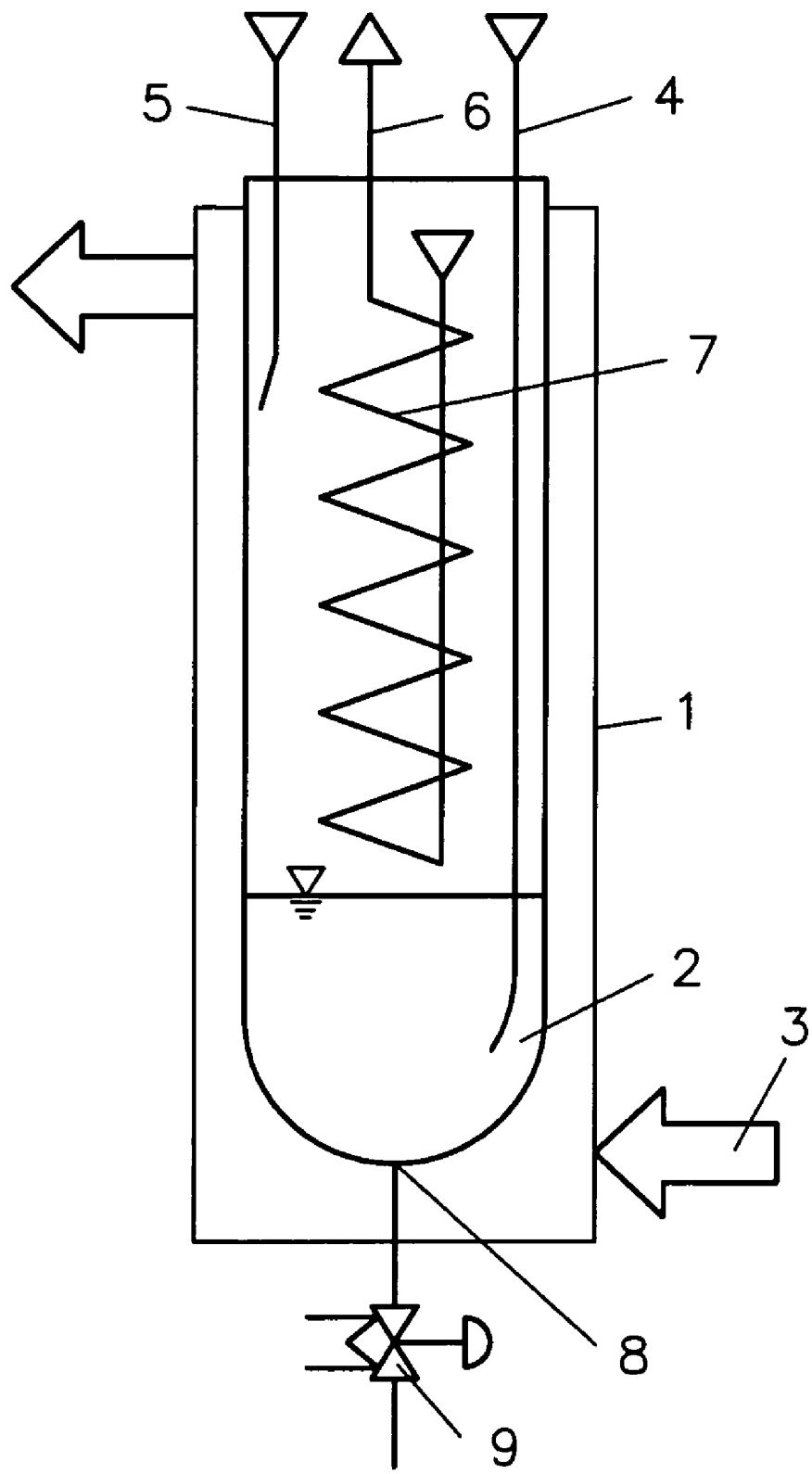

METHOD AND DEVICE FOR CONVERTING BIOMASS INTO GASEOUS PRODUCTS

CROSS REFERENCE TO PRIOR APPLICATIONS

This application is a U.S National Phase application under 35 U.S.C. §371 of International Application No. PCT/EP2007/011231, filed on Dec. 20, 2007 and which claims benefit to German Patent Application No. 10 2007 002 056.4, filed on Jan. 13, 2007. The International Application was published in German on Jul. 17, 2008 as WO 2008/083823 A1 under PCT Article 21(2).

FIELD

The present invention relates to a method and to a device for converting wet biomass, for example, biomass having a water content of at least 50%, into gaseous products.

BACKGROUND

When it comes to utilizing the energy of wet biomass via the modality of thermal decomposition, it is often the case that supercritical water, i.e. water at pressures and temperatures above the critical point of water (22.1 MPa and 374° C.) is used. Whereas supercritical water dissolves organic substances well, inorganic salts easily precipitate and can then clog the reactor.

FIELD

N. Boukis, U. Galla, V. Diem, E. Dinjus, in "Biomass gasification in supercritical water: First results of the pilot plant" in: A. V. Bridgewater, D. G. B. Boocock, Science in Thermal and Chemical Biomass Conversion, cplpress, Volume 2, page 975, 2006, describe a slender tubular flow reactor in which the salts that stem from the biomass and that are insoluble in supercritical water collect at the bottom. Since the precipitating salts have a consistency ranging from tacky to grainy, only the latter can be separated and even then, only partially, by means of methods such as, for example, sedimentation. Up until now, the wet biomass has been heated up to the reaction temperature in an upstream heat exchanger. This method is slow and it already initiates the reaction in the heat exchanger tube as soon as the requisite temperature has been reached.

In an alternative embodiment, the preheated, concentrated biomass is fed into the reactor together with supercritical water. For this purpose, there is sometimes a need for an unfavorable ratio of suspended biomass to supercritical heating water. Even though this accelerates the heating up procedure and shifts the time of the beginning of the reaction to the reactor, most of the salts precipitate in the reactor during the operation in a manner that is uncontrolled and makes them difficult to remove.

U.S. Pat. No. 4,822,497 describes a pressure vessel as a reactor for the oxidation of waste products in supercritical water, whereby the same problems are encountered in terms of salt formation and salt precipitation under reaction conditions. In order to prevent the undesired and detrimental accumulation of salts in the reactor, the system is operated in the bottom section with a water chamber that, by quenching, is kept at a temperature that is considerably lower than the critical temperature. Under these conditions, the salts from the reaction chamber located above dissolve once again in water. The oxidation in supercritical water is highly exothermic and therefore the quenching is justifiable from an energy standpoint. The gasification of biomass, in contrast, is endothermic and thus the quenching is not justifiable from an energy standpoint.

Y. Raja, in "Gasification of waste to produce low-BTU gas by molten salt technique" J. Institution of Engineers India, Volume 70, Part T2, page 15, 1989, describes that high conversion rates are achieved with biomass gasification in dry salt melts, although a great deal of carbon monoxide is generated in the process. In addition, a shift converter must be installed downstream for purposes of generating hydrogen. Moreover, the formation of charcoal or coke cannot be completely prevented during reactions in dry salt melts.

DE 202 20 307 U1 describes a system for treating flowable substances in supercritical water, consisting of a cylindrical reactor with pressure lines for the feedstock and for product discharge, whereby the product discharge line is configured as a stand pipe that protrudes into the reactor chamber from above and ends in the bottom third of the reactor, and a sump drain that is situated at the narrowest place and that has a cooler and an array of valves for the (dis)continuous sump drain is installed at the lower end of the reactor.

U.S. Pat. No. 6,878,479 B2 describes a device for converting fuels directly into electric energy, whereby electrochemical cells, each containing a molten electrolyte, are arranged in a bipolar, tilted configuration in such a way that the electric resistance between the cells is minimized.

US 2005/0066573 A1 describes a method for the thermal decomposition of graphite fibers and polymer composites in an inert atmosphere, wherein a plurality of graphite fibers that are bound to charred material are produced and subsequently, the charred material is separated from the graphite fibers by means of electrochemical oxidation in a salt melt.

EP 1 686 192 A1 describes a method for the production of monosaccharides or oligosaccharides from a polysaccharide, wherein the polysaccharide is hydrolyzed at a pressure of 5 MPa to 100 MPa and at a temperature ranging from 140° C. to 300° C. in a hydrothermal reaction in hot water to which carbon dioxide had been previously added under pressure.

G. Lee, T. Nunoura, Y. Matsumura and K. Yamamoto, in "Comparison of the Effects of the addition of NaOH on the decomposition of 2-chlorophenol and phenol in supercritical water and under supercritical water oxidation conditions", J. Supercritical Fluids, Volume 24, pages 239-250, 2002, describe that the influence of NaOH on the decomposition of organic compounds must be taken into account when the optimal reaction conditions and the optimal reactor design are being determined.

In their overview article titled "Probing the chemical and electrochemical properties of the SCWO System", Electrochimica Acta, Volume 47, pages 775-790, 2001, D. D. MacDonald and L. B. Kriksunov describe the advantages of and obstacles encountered with the use of supercritical water oxidation (SCWO). The advantages of SCWO in comparison to combustion stem from the use of closed cycles when the reaction is carried out, and also from the higher decomposition efficiency. The latter, however, comes at the expense of a higher corrosiveness in comparison to conventional materials.

K. Pripopsky, B. Wellig and Ph. R. von Rohr, in "SCWO of salt containing artificial wastewater using a transpiring wall reactor: Experimental results", J. Supercritical Fluids, Volume 40, pages 246-257, 2007, available from Science Direct as of Jul. 7, 2007, describe a reactor set-up having two partially permeable wall elements by means of which the problem of reactor contamination and clogging due to salt precipitation can be avoided.

M. Hodes, P. A. Marrone, G. T. Hong, K. A. Smith and J. W. Tester in "Salt precipitation and scale control in supercritical water oxidation, Part A: Fundamentals and research", J. Supercritical Fluids, Volume 29, pages 265-288, 2004, describe the principles of salt precipitation and scaling at high temperatures and pressures, phase diagrams of the salt-water system and the resultant phenomena.

Z. Sun, F. Takahashi, Y. Odaka, K. Fukushi, Y. Oshima and K. Yamamoto, in "Effects of potassium alkalis and sodium alkalis on the dechlorination of o-chlorophenol in supercritical water", Chemosphere, Volume 66, pages 151-157, 2007, available online as of Jun. 29, 2006, describe the influence of potassium alkalis and sodium alkalis on the dechlorination of o-chlorophenol in supercritical water.

M. D. Bermejo, A. Martin, L. J. Florusse, C. J. Peters and M. J. Cocero, in "The influence of $Na_2SO_4$ on the $CO_2$ solubility in water at high pressure", Fluid Phase Equilibria, Volume 238, pages 220-228, 2005, describe the effective decomposition of organic waste in the example of $Na_2SO_4$ in supercritical water. Decomposition rates of more than 99% with residence times of less than 1 minute were observed.

M. D. Bermejo, A. Martin, L. J. Florusse, C. J. Peters and M. J. Cocero, in "Bubble points of the systems isopropanol-water, isopropanol-water-sodium acetate and isopropanol-water-sodium oleate at high pressure", Fluid Phase Equilibria, Volume 244, pages 78-85, 2006, describe that oxidation in supercritical water is an effective technique for decomposing organic waste at a high yield. As soon as sufficient cations are present, the heteroatoms present precipitate in the form of salts and can be ultimately recovered.

SUMMARY

An aspect of the present invention is to provide a method and a device that do not have at least some of the above-mentioned drawbacks and limitations. In particular, in an embodiment, the thermal decomposition of the biomass and the formation of additional salts from the biomass should take place once the biomass has reached the reactor so that the additional salts can be bound directly at the place of their formation.

In an embodiment, the present invention provides a method for converting biomass having a water content of at least 50% into gaseous products. The method includes providing a reactor containing supercritical water and a salt melt, wherein the salt melt includes at least one of a salt and a salt mixture having a melting point below a reaction temperature required to convert the biomass into the gaseous products. The reactor and the salt melt are heated to the reaction temperature. The biomass is heated to a preheat temperature at which detrimental decomposition of the organic compounds in the biomass does not occur. The biomass heated to the preheat temperature is fed into the salt melt using a first feed pipe immersed in the salt melt so as to heat the biomass to the reaction temperature so as to commence a conversion of the biomass into the gaseous products so as to, by completion of the conversion, release from the biomass at least one additional salt into the salt melt. An amount of the salt melt containing at least a portion of the at least one additional salt is withdrawn from the reactor and the amount of the withdrawn salt melt is replaced with a fresh salt solution. The gaseous products are removed from the reactor using an outlet pipe.

BRIEF DESCRIPTION OF THE DRAWING

The present invention will be described in greater detail on the basis of exemplary embodiments with reference to the FIGURE.

The FIGURE shows an embodiment of a device according to the present invention for carrying out the method according to the present invention.

DETAILED DESCRIPTION

The method according to the present invention is carried out in a pressure reactor at a pressure above the critical pressure of water, preferably above 22.5 MPA, said pressure being applied in a first step a). A sufficiently extensive, stationary salt melt is present in the bottom area of the reactor.

The melting point of the salt used for the salt melt or the melting point of the salt mixture used for this purpose has to be below the reaction temperature at which the biomass is converted into a gaseous product. As a rule, the reaction temperature is between 550° C. and 700° C. [1022° F. and 1292° F.].

Suitable salts preferably include alkali salts, especially preferred are alkali nitrates, alkali hydroxides, alkali carbonates or alkali hydrogen carbonates that form hydrous melts having low melting points. Examples of suitable salt mixtures are a 50:50 mixture of $NaNO_3$ and $KNO_3$ (melting point of 223° C. [433.4° F.]) or a 56:44 mixture of $LiNO_3$ and $KNO_3$ (melting point of 125° C. [257° F.]). An example of a suitable salt is KOH having a melting point of 360° C. [680° F.].

The salts or salt mixtures employed for the salt melt preferably have the following properties as well:
  They exhibit sufficient thermal stability for temperatures of up to 700° C. [1292° F.].
  Their corrosiveness is as low as possible.
  When additional salts from the conversion of the biomass are fed in, the melting point only changes to an extent that does not substantially impair the execution of the process.
  The viscosity ensures the flowability of the salt melt in the reactor.
  The specific heat allows a rapid heating up of the preheated biomass through contact with the salt melt.

In step b), the reactor and the salt melt contained in it are heated up from the outside to the reaction temperature that is required to convert the biomass into gaseous products. The heating up is done, for example, with flue gases.

In step c), the biomass is first heated up in a heat exchanger to a preheat temperature at which detrimental decomposition of the organic compounds does not yet begin. Subsequently, the biomass thus heated up is fed into the salt melt through a feed pipe that is immersed into the salt melt which, due to its insolubility in the supercritical water, forms an aqueous salt phase.

In step c), the biomass is then quickly heated up in this salt bath to the reaction temperature. In this process, the amount of biomass fed in and the amount of salt melt are preferably harmonized with each other in such a way that the biomass is heated up to the reaction temperature as quickly as possible already during the contact time of the two media.

This starts up the thermal decomposition of the biomass within a very short time and the biomass carbon is available in a suitable form for the water cleavage (so-called water-gas shift reaction).

The salts released by the thermal decomposition of the biomass in step c) are held in the salt melt. In this context, the reactor is configured in such a way that the formation of a salt melt film is prevented. A salt melt film resembles the falling films known from evaporator technology, and it consists of the same salt melt as that in the bottom area of the reactor and causes incrustation on the inner surface of the reactor due to precipitating biomass salts (subsequent thermal decomposition reactions) in the supercritical plenum of the reactor.

In step d), a portion of the salt melt enriched with salts stemming from the biomass is withdrawn via a drain located at the bottom of the reactor, preferably at periodic intervals. The amount of salt removed is replaced with a fresh salt mixture.

In step e), the gaseous products are removed from the reactor via an outlet pipe.

A device according to the present invention for converting biomass having a water content of at least 50% into gaseous products comprises at least the following components:
- a pressure reactor that can be operated at a pressure above the critical pressure of water, preferably above 22.5 MPA, and that is suitable to hold a salt melt,
- a heater that is suitable to heat up the reactor and the salt melt contained in it to the reaction temperature that is necessary to convert the biomass into gaseous products,
- a first feed pipe that is immersed into the salt melt for feeding into the reactor the biomass that was heated up to a preheat temperature at which decomposition of the organic compounds does not yet occur in the biomass,
- a second feed pipe for feeding water and salt solution into the reactor,
- an outlet pipe for discharging the gaseous reaction products out of the reactor, and
- a drain at the bottom of the reactor for withdrawing from the reactor portions of the salt melt that is enriched with the additional salts that have come out of the biomass.

Preferably, a tube reactor that removes heat from the gaseous products is installed upstream from the outlet pipe.

Preferably, a heated valve that lends itself especially to control the periodic removal of portions of the salt melt is provided in the drain at the bottom of the reactor.

The method according to the present invention has, in particular, the following advantages:
- The thermal decomposition of the biomass and thus the formation of the additional salts from the biomass do not begin until the preheat temperature inside the reactor has been exceeded, so that the salts can be bound directly at the place of their formation.
- The binding of the salts from the thermal decomposition of the biomass takes place in the provided salt melt that at the same time serves as a heat source for heating up the preheated biomass to the reaction temperature.
- If the salt melt comprises an alkali salt or a salt mixture in which at least one component is an alkali salt, then the reactivity of the biomass can additionally be raised during the heating in the salt melt from the preheat temperature to the reaction temperature to such an extent that the bound carbon atoms contained in the biomass are converted into $CO_2$ and $CH_4$ to the greatest degree possible.
- The bound salts can be removed from the reactor without adversely affecting the operation.

A salt melt 2 is fed into a slender pressure reactor 1 and heated to the reaction temperature by means of a heater 3. The biomass that was heated up to a preheat temperature at which detrimental decomposition of the organic compounds does not yet occur in the biomass is fed into the reactor through a first feed pipe 4 that is immersed into the salt melt 2. A second feed pipe 5, which in this case is not immersed into the melt, serves for feeding water and salt solution into the reactor 1. An outlet pipe 6, which in this case likewise is not immersed into the salt melt, serves to discharge the gaseous reaction products out of the reactor 1. In this embodiment, a tube reactor 7 is installed upstream from the outlet pipe 6. At the bottom of the reactor 1, there is a drain 8 for removing from the reactor 1 portions of the salt melt 2 that is enriched with the additional salts that had come out of the biomass. The preferably periodic removal of portions of the salt melt 2 from the reactor 1 is preferably regulated by a heated valve 9.

The present application is not limited to embodiments described herein; reference should be had to the appended claims.

The invention claimed is:

1. A method for converting biomass having a water content of at least 50% into gaseous products, the method comprising:
    a) providing a reactor containing supercritical water and a salt melt, wherein the salt melt includes at least one of a salt and a salt mixture having a melting point below a reaction temperature required to convert the biomass into the gaseous products;
    b) heating the reactor and the salt melt to the reaction temperature;
    c) heating the biomass to a preheat temperature at which detrimental decomposition of the organic compounds in the biomass does not occur, and feeding the biomass heated to the preheat temperature into the salt melt using a first feed pipe immersed in the salt melt so as to heat the biomass to the reaction temperature so as to commence a conversion of the biomass into the gaseous products so as to, by completion of the conversion, release from the biomass at least one additional salt into the salt melt;
    d) withdrawing from the reactor an amount of the salt melt containing at least a portion of the at least one additional salt and replacing the amount of the withdrawn salt melt with a fresh salt solution; and
    e) removing the gaseous products from the reactor using an outlet pipe.

2. The method recited in claim 1, further comprising associating an amount of the biomass with a second amount of the salt melt so that the biomass is heated to the reaction temperature during a contact time of the biomass with the salt melt.

3. The method recited in claim 1, wherein the at least one of a salt and a salt mixture comprises an alkali salt.

4. The method recited in claim 2, wherein the at least one of a salt and a salt mixture comprises an alkali salt.

5. The method recited in claim 1, wherein the at least one of a salt and a salt mixture comprises at least one of an alkali nitrate, an alkali hydroxide, an alkali carbonate and an alkali hydrogen carbonate.

6. The method recited in claim 1, wherein the withdrawing of the amount of the salt melt from the reactor is performed at periodic intervals.

7. The method recited in claim 2, wherein the withdrawing of the amount of the salt melt from the reactor is performed at periodic intervals.

8. The method recited in claim 3, wherein the withdrawing of the amount of the salt melt from the reactor is performed at periodic intervals.

9. The method recited in claim 4, wherein the withdrawing of the amount of the salt melt from the reactor is performed at periodic intervals.

10. The method recited in claim 5, wherein the withdrawing of the amount of the salt melt from the reactor is performed at periodic intervals.

* * * * *